(12) United States Patent
Abe et al.

(10) Patent No.: US 7,761,866 B2
(45) Date of Patent: Jul. 20, 2010

(54) SOFTWARE UPDATING METHOD AND RADIO COMMUNICATION APPARATUS

(75) Inventors: Katsuaki Abe, Kanagawa (JP); Takenori Sakamoto, Tokyo (JP)

(73) Assignee: Panasonic Corporation, Osaka (JP)

( * ) Notice: Subject to any disclaimer, the term of this patent is extended or adjusted under 35 U.S.C. 154(b) by 1130 days.

(21) Appl. No.: 10/545,869

(22) PCT Filed: Feb. 16, 2004

(86) PCT No.: PCT/JP2004/001650

§ 371 (c)(1), (2), (4) Date: Aug. 17, 2005

(87) PCT Pub. No.: WO2004/074975

PCT Pub. Date: Sep. 2, 2004

(65) Prior Publication Data
US 2006/0150174 A1    Jul. 6, 2006

(30) Foreign Application Priority Data
Feb. 19, 2003   (JP)   ............... 2003-041131
Jan. 26, 2004   (JP)   ............... 2004-016816

(51) Int. Cl.
G06F 9/445   (2006.01)
G06F 9/44    (2006.01)

(52) U.S. Cl. ............... 717/173; 717/168; 717/169; 717/170; 717/171; 717/172

(58) Field of Classification Search ............... 717/173, 717/168–172; 726/31
See application file for complete search history.

(56) References Cited

U.S. PATENT DOCUMENTS

| | | | |
|---|---|---|---|
| 5,410,703 A | | 4/1995 | Nilsson et al. |
| 5,715,474 A | * | 2/1998 | Burke et al. ............... 710/6 |
| 5,771,347 A | * | 6/1998 | Grantz et al. ............. 726/31 |
| 6,345,387 B1 | * | 2/2002 | Morrison ................. 717/170 |
| 7,320,011 B2 | * | 1/2008 | Koskimies ................ 707/201 |
| 7,350,205 B2 | * | 3/2008 | Ji .............................. 717/172 |

(Continued)

FOREIGN PATENT DOCUMENTS

EP          0 679 979         11/1995

(Continued)

OTHER PUBLICATIONS

Costilla, et al. "SIRIO: A Distributed Information System Over a Heterogeneous Computer Network", 1993, SIGMOND Record, p. 28-33.*

(Continued)

*Primary Examiner*—Wei Y Zhen
*Assistant Examiner*—Qamrun Nahar
(74) *Attorney, Agent, or Firm*—RatnerPrestia

(57) ABSTRACT

A radio communication apparatus to be changed in function by software, when downloading software from a download server, first downloads software limited in operation and then configures a software radio section. After the configuration and the operation confirmation have been normally completed, execution-allowing key information is requested and received. Using it, reconfiguration is carried out in part thereby enabling all the operations. Accordingly, it is possible to safely carry out a download and a setting update of software to the radio communication apparatus.

18 Claims, 8 Drawing Sheets

U.S. PATENT DOCUMENTS

| | | | |
|---|---|---|---|
| 7,373,643 B2 * | 5/2008 | Radatti | 717/173 |
| 7,401,127 B2 * | 7/2008 | Tsuda et al. | 709/217 |
| 7,403,792 B2 * | 7/2008 | Takahashi | 455/550.1 |
| 7,502,813 B2 * | 3/2009 | Ljung | 707/203 |
| 2002/0170052 A1 * | 11/2002 | Radatti | 717/171 |
| 2004/0034861 A1 * | 2/2004 | Ballai | 717/168 |
| 2004/0038647 A1 * | 2/2004 | Mahany | 455/73 |
| 2005/0055595 A1 * | 3/2005 | Frazer et al. | 713/400 |

FOREIGN PATENT DOCUMENTS

| | | |
|---|---|---|
| JP | 2-176954 | 7/1990 |
| JP | 9-331579 | 12/1997 |
| WO | WO 03/010663 A2 | 2/2003 |

OTHER PUBLICATIONS

International Search Report corresponding to application No. PCT/JP2004/001650 dated Jul. 1, 2005.

* cited by examiner

US 7,761,866 B2

SOFTWARE UPDATING METHOD AND RADIO COMMUNICATION APPARATUS

THIS APPLICATION IS A U.S. NATIONAL PHASE APPLICATION OF PCT INTERNATIONAL APPLICATION PCT/JP2004/001650.

TECHNICAL FIELD

The present invention relates to a software updating method and radio communication apparatus which is to be updated by downloading software, in a radio communication apparatus having a function to be changed by changing software.

BACKGROUND ART

In the radio communication apparatuses (hereinafter, referred to as software radio apparatuses) having a function to be changed by changing software, there is disclosed an example, e.g., in JP-A-02-176954 and JP-A-09-331579, as a method for updating a function by downloading software (hereinafter, referred to as configuration) and carrying out radio communications based on a new function.

Using FIG. 8, explanation is made below on one example of arrangement and operation of a method for updating the setting on a radio apparatus by downloading the conventional software.

The software data 706, to be downloaded from the download server 702 to the software radio apparatus 700, is conveyed through a channel 705. A download control section 703 confirms whether or not data part transmitted has an injury due to erroneous reception or the like, to thereby download the data part while taking a process of resending or so as required. Herein, the to-be-downloaded software is concretely a program for the CPU (Central Processing Unit), the DSP (Digital Signal Processor) or the like constituting the software radio section 701, including FPGA (Field Programmable Gate Array) configuration data and further control information for an analog-digital converting section and analog processing section.

The downloaded software 707 is stored in a non-volatile memory section 7011 structured by a flash ROM or the like. When download is completed in the software entirety, the notification information 708 about download normal completion is supplied from the download control section 703 to the configuration control section 7012. In the software radio section 701, the program and setting data etc. stored in the non-volatile memory section 7011 is read out under control of the configuration control section 7012 and supplied to each component section through a bus 7013, thus implementing configuration.

In the arrangement and operation as above, the software is read in the software radio section 701. The function on the new software is made usable.

However, in the case to change the function of software radio section by downloading software by the arrangement like the above, a problem arises as follows.

Namely, when the software radio section 701 is configured by the new software, in case configuration can not be normally done and the software radio section stayed in abnormal setting is started up, there is a possibility to send an unnecessary radio signal resulting in disturbance to other stations.

DISCLOSURE OF THE INVENTION

It is an object of the present invention to provide a software update method and a radio communication apparatus using the method, made in order to solve the foregoing conventional problem, for preventing the operation, such as abnormal radio transmission, encountered where configuration is not normally made during configuring a software radio apparatus by downloading software.

A method of updating software according to the present invention, in a radio communication system comprising a radio communication apparatus having a communication function to be changed by changing software and a download server for supplying software to the radio communication apparatus, has: a step for the radio communication apparatus to download software data limited in communication function from the download server; a step for the radio communication apparatus to reconfigure the communication function by use of the software data which the radio communication apparatus has downloaded; a step for the radio communication apparatus to test for a communication function reconfigured; a step for the radio communication apparatus to request execution-allowing key information for canceling the function limitation in a case determining the test result normal; a step for the download server to supply the execution-allowing key information to the radio communication apparatus in response to the request; and a step for the radio communication apparatus to cancel the function limitation by use of the execution-allowing key information supplied.

Due to this, the radio communication apparatus is first released of function limitation after confirming that software update is normal. Accordingly, abnormal radio transmission is prevented from being made due to update abnormality.

Meanwhile, a method of updating software according to the invention, in a radio communication system comprising a radio communication apparatus having a communication function to be changed by changing software and a license server for supplying execution-allowing key information for canceling a limitation in the communication function, has: a step for the radio communication apparatus to download software data limited in communication function which is read from a media connected; a step for the radio communication apparatus to reconfigure the communication function by use of the software data downloaded; a step for the radio communication apparatus to test for a communication function reconfigured; a step for the radio communication apparatus to request execution-allowing key information for canceling the limitation to the license server in a case determining the test result normal; a step for the license server to supply the execution-allowing key information to the radio communication apparatus in response to the request; and a step for the radio communication apparatus to cancel the limitation by use of the execution-allowing key information supplied.

Due to this, the radio communication apparatus, even in the case initially not possessing a communication function but allowed to acquire software only from a media, can update software and hold a communication function. Furthermore, because function limitation is canceled only after confirming that software update is normal, abnormal radio transmission is prevented from being made due to update abnormality.

Meanwhile, A method of updating software according to the invention has: a step for a radio communication apparatus having a communication function to be changed by changing software to download software data limited in communication function which is read out of a first media connected; a step for the radio communication apparatus to reconfigure the communication function by use of the software data downloaded; a step for the radio communication apparatus to test for a communication function reconfigured; a step for the radio communication apparatus to read execution-allowing key information for canceling the limitation out of a second media in a case determining the test result normal; and a step for the radio communication apparatus to cancel the function limitation by use of the execution-allowing key information.

Due to this, the radio communication apparatus, even in the case initially not possessing a communication function but capable of obtaining software only from a media, can update software and hold a communication function. Furthermore, because function limitation is canceled without using the communication function after confirming that software update is normal, abnormal radio transmission is prevented from being made due to update abnormality. Furthermore, even in case that communications over a network or the like are not in an unavailable state, processing of canceling the limitation is possible.

Meanwhile, a radio communication apparatus in a method of updating software according to the invention, further provides a step for the radio communication apparatus to write information representative of being already-used to the second media after canceling the limitation by use of the execution-allowing key information. Due to this, the second media is prevented from being unduly reused to cancel the function limitation from another radio communication apparatus.

Meanwhile, a communication function test in a method of updating software according to the invention is to output a transmission signal generated by the radio communication apparatus as a power that can be detected by the radio communication apparatus itself, to determine whether or not the transmission signal received satisfies a predetermined performance, and thus to render it normal in a case of satisfying. Due to this, the radio communication apparatus singly is allowed to determine whether or not software update has been normal.

Meanwhile, the predetermined performance to be determined by a communication function test in a method of updating software according to the invention means that a spectrum mask of transmission signal, leak power to an outside of occupation band, modulation accuracy of a modulation signal including phase jitter and amplitude variation, and reception power, are within a range of a predetermined value. Due to this, it is possible to detect a bad effect upon another apparatus due to a fact the radio communication apparatus has not been normally updated in software.

Meanwhile, in a method of updating software according to the invention, it is characterized in that download of the software data is by way of a first communication link, while transmission of execution-allowing key information is by way of a second communication link. Due to this, for software data download and execution-allowing key information transmission, optimal communication link can be selected respectively.

Meanwhile, the first communication link in a method of downloading updating software according to the invention is a communication link in a broadcast type or a multicast type, and the second communication link is a link in a communication type. Due to this, it is possible to achieve both communication link traffic efficiency improvement and privacy assurance.

Meanwhile, the function limitation in a method of updating software according to the invention is at least any one limitation of a digital signal process and an analog reception process in the radio communication apparatus, the execution-allowing key information is differential program data for restoring a program of the digital signal process in a case a digital signal process is limited, and is control data for canceling an operation limitation in the analog reception process in a case an analog reception process is limited.

Due to this, because limitation is not added in respect of analog transmission process possibly having an effect upon radio-wave transmission performance, transmission performance does not change at around limitation cancellation. Negative effect can be prevented from being exerted to other radio equipments after canceling the limitation.

A radio communication apparatus according to the invention having a communication function to be changed by changing software is characterized by comprising: a download control section for downloading software limited in part of communication function from a download server for supplying software and execution-allowing key information for canceling the limitation; a software radio section for storing software downloaded by the download control section and updating the communication function by use of software stored; and a test section for determining whether the communication function reconfigured is normally done or not; whereby, when the test section determines it normal, the download control section downloads the execution-allowing key information and cancels the limitation to the software radio section.

Due to this, the radio communication apparatus is canceled of function limitation only after confirming that software update is normally done. Accordingly, it is possible to prevent abnormal radio transmission from being carried out due to update abnormality.

Meanwhile, the software radio section of a radio communication apparatus according to the invention has a non-volatile memory section for storing the software downloaded by the download control section, and a configuration control section for updating communication function by use of the software stored. Due to this, even in case the radio communication apparatus is powered off, the downloaded software can be held. Accordingly, reconfiguration can be made by the configuration control section in any time convenient for the radio communication apparatus.

Meanwhile, the software limited in function of a radio communication apparatus according to the invention is a rewrite in part of a program for a digital signal processing section in the software radio section, and the execution-allowing key information is differential program data for restoring the program for a digital signal processing section. Due to this, because limitation is not made in respect of analog transmission process possibly having an effect upon radio-wave transmission performance, transmission performance does not change at and around limitation cancellation. Negative effect can be prevented from being exerted to other radio equipments after canceling the limitation.

Meanwhile, a radio communication apparatus according to the invention is characterized by comprising: an interface section for having a connection with a media storing software; a first download control section for downloading software limited in communication function from the media through the interface section; a software radio section for updating the communication function by use of software downloaded by the download control section; a second download control section for having a connection to a license server for supplying execution-allowing key information to cancel the limitation through a wireless communication channel connected with the software radio section; and a test section for determining whether the communication function reconfigured by the software data is normal or not; whereby, when the test section determines the function normal, the second download control section downloads the execution-allowing key information and cancels the limitation to the software radio section.

Due to this, the radio communication apparatus, even in the case initially not possessing a communication function but allowed to acquire software only from a media, can update software and hold a communication function. Furthermore, because software update normality can be confirmed without using communication function, it is possible to prevent abnormal radio transmission due to update abnormality. Furthermore, even in case that communications over a network or the like are not in an unavailable state, processing of canceling the limitation is possible.

Meanwhile, the software to be downloaded by a radio communication apparatus according to the invention includes a program for connecting through a wireless communication channel with the license server by updating the software radio section. Due to this, the radio communication apparatus, even in the case initially not possessing a communication function but allowed to acquire software only from a media, can update software and hold a communication function. Furthermore, because function limitation is canceled only after confirming that software update is normal, abnormal radio transmission is prevented from being made due to update abnormality.

Meanwhile, a radio communication apparatus according to the invention having a communication function to be changed by changing software is characterized by comprising: an interface section for having a connection with a media storing at least any one of software data and execution-allowing key information for canceling communication function limitation; a download control section for downloading, from the media, the software data limited in communication function and the execution-allowing key information; and a test section for determining whether the communication function updated by the software is normal or not; whereby, when the test section determines the function normal, the download control section downloads the execution-allowing key information and cancels the limitation to the software radio section.

Due to this, the radio communication apparatus, even in the case initially not possessing a communication function but allowed to acquire software only from a media, can update software and hold a communication function. Furthermore, after confirming that software update is normal, function limitation is canceled only by acquiring execution-allowing key information from the media. Communications can be commenced after placed in the final state. Accordingly, it is possible to prevent abnormal radio transmission due to an unsettled status.

As above, according to the present invention, it is possible to prevent abnormal radio transmission from encountering where configuration with downloaded software is not normally completed, causing an imperfect state of radio apparatus.

Meanwhile, similar effect is available where the function of a software radio apparatus is updated by reading out the software stored in a storage media.

BEST MODE FOR CARRYING OUT THE INVENTION

Hereunder, embodiments of the present invention will be explained in detail by using the drawings.

Embodiment 1

This embodiment explains the arrangement and procedure for obtaining an execution permission for all the post-update functions by receiving again the execution-allowing key information in the final stage of download during updating, by downloading software, onto so-called a software radio apparatus having a function to be changed by changing software.

Figure 1:
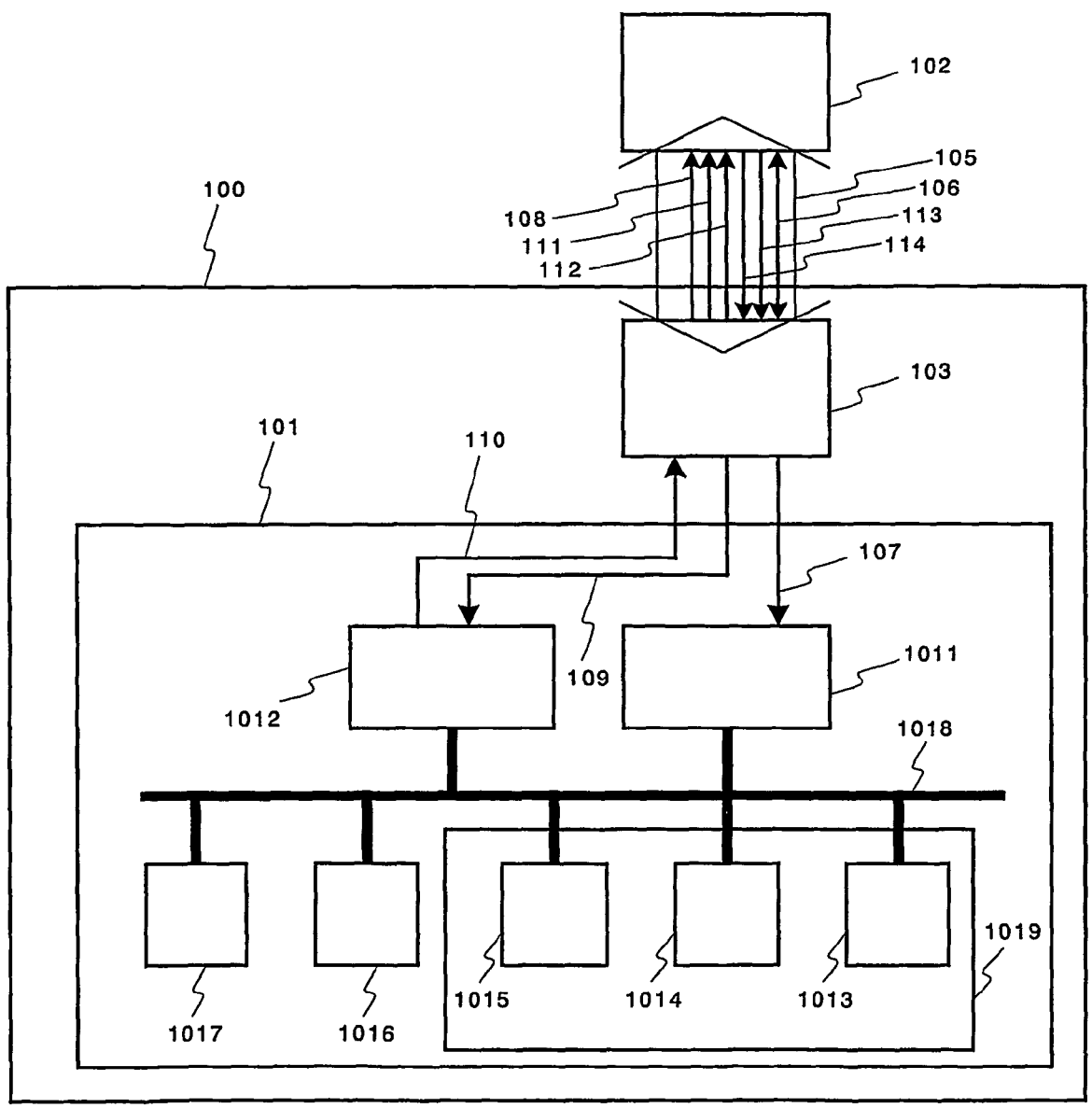
FIG. 1 is a download system arrangement diagram for a software radio apparatus in a first embodiment of the present invention.

FIG. 1 shows a download system for a software radio apparatus in a first embodiment, which is constituted by a software radio apparatus 100, a download server 100 and a communication link 105.

Furthermore, the software radio apparatus 100 comprises a software radio section 101 and a download control section 103. The software radio section 101 is a radio apparatus having a function to be changed by rewriting the software. This is arranged, for example, by a non-volatile memory section 1011, a configuration control section 1012, a digital-signal processing section 1019, an analog-digital converting section (A/D·D/A converting section) 1016, and an analog processing section 1017.

The non-volatile memory section 1011 stores input software program data and reads and outputs data as required. This is arranged by a device, e.g., a flash ROM or an EEPROM, having a storage content not to be erased even when power is off.

The configuration control section 1012 configures the component sections by the use of a downloaded stored program and setting data according to download-completion notifying information 109, and outputs control information 110 about whether configuration has been completed or not.

The digital-signal processing section 1019 is arranged by a central processing unit (CPU) 1013, a digital signal processor (DSP) 1014, and a programmable gate array (FPGA) 1015, the processing content of which can be changed by rewriting the program or configuration data.

Incidentally, the CPU 1013 carries out the operation processing and control processing required in the software radio section 101, on the basis of the program read therein. Various types of CPU devices are applicable. Incidentally, the arrangement may be such that operating system (OS) is read in the CPU as required so that the software radio processing program and other component sections can be executed and controlled over the OS.

Meanwhile, the DSP 1014 carries out the complicated, large amount of signal processing uniquely required in software radio processing, on the basis of the program read therein. Various DSP devices are applicable.

Meanwhile, the FPGA 1015 carries out the operation processing and control required in the software radio section 101, on the basis of the configuration data read therein. Various types of FPGAs (Field Programmable Gate Array) devices, PLDs (Programmable Logic Devices) and the like are applicable.

The analog-digital converting section 1016 is to convert the signal of the analog processing section to/from the digital processing section, in the software radio section 101. This is configured by an A/D converter for quantizing an analog signal and converting it into a digital signal, and a D/A converter for converting a digital signal and converting it into an analog signal. The invention is arranged to control, for example, sampling rate, quantization bits and converted-signal output on/off as required, for the above A/D converter and D/A converter. Importance is placed in that these of control data are included in part of the software data supplied from a download server 102. There are no limitations in the converter internal arrangement, the number and the like.

The analog processing section 1017 carries out the analog signal processing in the software radio section 101, specifically frequency conversion processing and amplification processing, for example, in respect of radio communications. This is arranged by a synthesizer section, a mixer section, a filter section, an amplifier section and so on. The arrangement may be such that the oscillation frequency in the synthesizer section, the frequency characteristic in the filter section, and the gain in the amplifier section can be placed under control, as required. The control data, in this case, can be a part of the software to be supplied from the download server 102.

The download control section 103 transmits the data for downloading software data with the download server 102 through the communication link 105. This also outputs a downloaded program, setting data, etc. to the non-volatile memory section 1011, and inputs/outputs control information 109, 110 to/from the configuration control section 1012.

The download server 102 carries out data transmission with the download control section 103 in the software radio apparatus 100 through the communication link 105, to supply software data to the software radio apparatus 100.

In the invention, although the form of communication link 105 is not especially limited, the arrangement may use, for example, a connection based on the Internet protocol, a serial connection such as USB, or the like. Otherwise, the arrangement may use a wireless communication link.

In the download system for a software radio apparatus arranged as above, explanation is made step by step in the below on the method and procedure for downloading and configuring software data onto the software radio apparatus 100, while using a flowchart shown in FIG. 2.

In the case to change the function of the software radio section 101, a required procedure is made in starting a download transmission session between the download server 102 and the download control section 103 (step S101). Although various methods have already been disclosed concerning the operation and procedure at a start of session, the invention is not especially limited in this part of operation and procedure. Also, the invention does not require to positively carry out individual authentication in the stage of download start procedure.

Subsequently, data part of software is transmitted from the download server 102 through the communication link 105. The download control section 103 of the software radio apparatus 100 confirms whether or not there is a corruption, etc. in the data part due to erroneous reception. It carries out a downloading of the data part while taking a procedure of retransmission or the like, as required (step S102). In the software radio apparatus arrangement like this embodiment, the program and setting data 107 for component sections acquired by the download are stored to the non-volatile memory 1011. Herein, the setting data for component sections, in part, is intentionally rewritten and restricted in operation. For example, in the case the downloaded program is a program part of CPU or DSP, rewrite is made to limit some of the subroutine calls. Meanwhile, in the case the downloaded setting data is a configuration-data part for FPGA, rewrite is made not to configure some of I/O pins' connection setting. The analog-digital converting section 1016 is under control to allow conversion output up to a certain restricted time limit. In the analog processing section 1017, the receivable channels in radio signal reception are assumably limited to particular part of channels or gain amount upon reception-signal amplification is assumably limited. Incidentally, the limitation as above may be in all the component sections. Otherwise, programs or setting data may be rewritten to provide a limitation only to part of component sections.

These limitations are added to the digital-signal process or an analog-reception process having no effect upon transmission performance. It is not added to the analog-transmission process possibly having an effect upon the performance of radio transmission. Thus, transmission performance is free from change before and after canceling the limitation.

Then, the download control section 103 of the software radio apparatus 100 determines whether or not data part of software has been normally downloaded to the non-volatile memory section 1011. In the case not normally downloaded, notified is download-failure notification information 108 for notifying the fact of download failure to the download server 102 (step S110). Then, the process is ended (step S102). Herein, as for download success/failure, previously added is a CRC parity check code for downloaded software data. Determination can be easily made by the known method, e.g., carrying out an error detection process by using this code. As for success/failure determination, check codes may be generated consistently for all the component sections, or check codes may be generated respectively for component sections. In the case of a normal completion of download, download-completion notification information 109 is supplied to the configuration control section 1012, and the process moves to procedure (step S104).

Then, the configuration control section 1012 of the software radio apparatus 100 reads out the programs and setting data stored in the non-volatile memory section 1011 and supplies it to each constituent section through the bus. Thus, configuration is performed for the software radio section 101 (step S104). Specifically, executed are a change of the PLL-setting parameter of the synthesizer in the analog processing section 1017, a change in setting value of quantization bits and sampling rate in the analog-digital converting section 1016, a reconfiguration of the gate array in the FPGA 1015, loading of an execution program in the DSP 1014 and CPU 1013, for example.

Then, the configuration control section 1012 of the software radio apparatus 100 determines whether or not configuration on each constituent section has been completed, and supplies a determination result 110 to the download control section 103 (step S105).

Herein, explained below are concrete examples as to in what way determination is made for a success/failure of configuration completion on each constituent section.

As a first concrete example, it is assumed that a predetermined frequency band and specific communication scheme is previously prepared for the functional test on the software radio section 101, a test station is separately prepared remotely that a performance test on the transmission signal from the software radio section 101 is to be conducted by using the frequency band, and the software provided from the download server 102 includes a program and data setting for conducting a test operation with the foregoing test station. In such an environment, the software radio section 101 changes the setting of component sections to meet a predetermined frequency and predetermined scheme prepared for the functional test, on the basis of the downloaded, configured program and setting data. The test station receives a test transmission signal sent from the software radio section 100 and evaluates whether or not its performance satisfies a desired regulation. Herein, the desired regulation includes, for example, a regulation concerning the spectral mask for transmission signal and the leak component to an outside of the occupation band and a regulation concerning a modulation accuracy or frequency accuracy of modulation signal. In the case determined that the desired performance satisfies the regulation, the test station sends a predetermined modulation signal at a predetermined frequency band inserted with the information for confirming normal operation to the software radio section 101. The software radio section 101 receives the foregoing signal normally, and determines that, by receiving the information for confirming normal operation from a reception result, the transmission and reception operations in the software radio section 101 have functioned normally to normally complete the configuration. Herein, the test communications between the software radio section 101 and the test station may be in an arrangement to be conducted within a closed space, such as a shield room preventing against radio wave leak toward the outside. Also, the test communications between the software radio section 101 and the test station are not necessarily through the radio channel but may be in an arrangement to be conducted by a wired-connection to the test station using a cable from an antenna I/O port.

Figure 7:
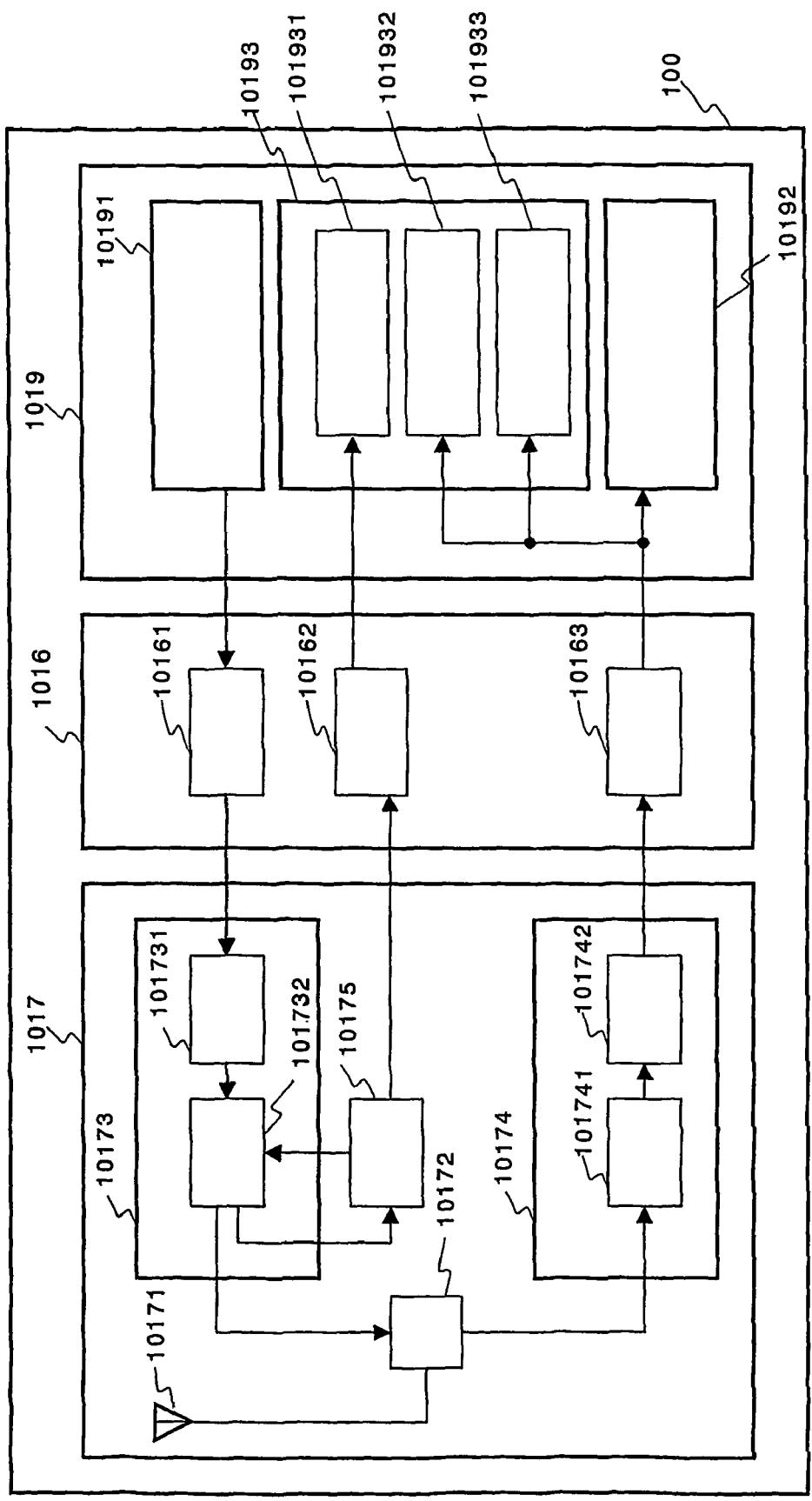
FIG. 7 is a detailed arrangement diagram of a software radio apparatus in the first embodiment of the invention.
Figure 8:
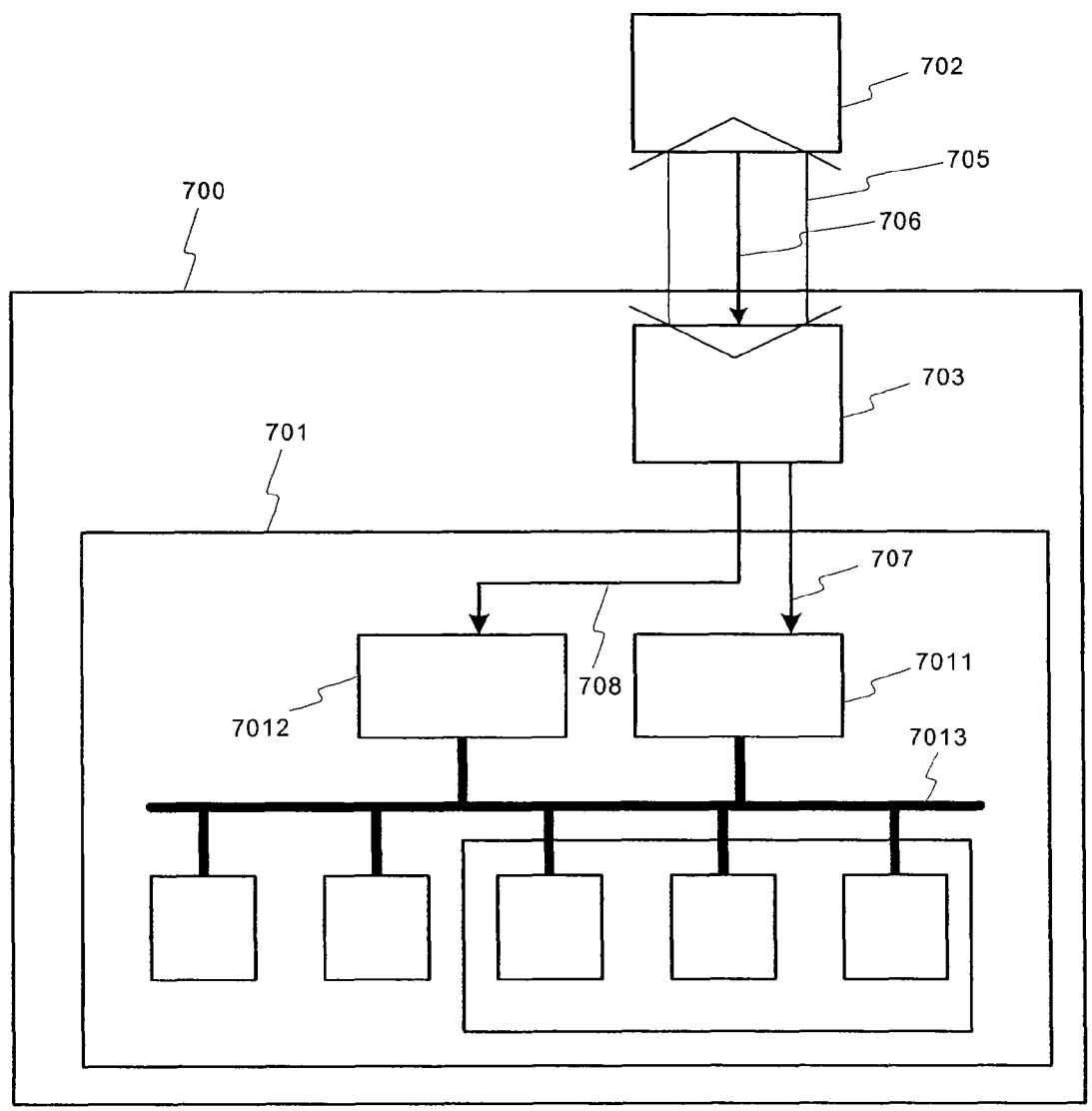
FIG. 8 is a diagram showing an example of a conventional software download system.

As a second concrete example, explained is the arrangement and operation example where the software radio section 101 determines by itself a success/failure of configuration without separately using a test station, by using FIG. 7. Incidentally, explanation is herein made as an example on the case that communications are carried out on TDD (time division duplex).

FIG. 7 is a diagram showing an arrangement example in greater detail of the software radio apparatus 100 of FIG. 1. Although FIG. 1 depicts only the connection relationship of the control flow, FIG. 7 depicts a connection relationship of the signal flow.

The analog processing section 1017 has an antenna 10171, an antenna switch 10172, an analog-transmission processing section 10173, an analog-reception processing section 10174 and a power monitor section 10175. The analog-transmission processing section 10173 has various processing sections for generating a predetermined analog-transmission signal. However, shown herein are a frequency converting section 101731 for frequency-converting at least an input analog-transmission signal in a low frequency band into a predetermined RF frequency band, and a power amplifying section 101732 for amplification into a predetermined transmission power. Meanwhile, this software radio apparatus 100 is assumably added with a function to control the level of transmission power. For the transmission-power level control, the arrangement is assumably that the power value of a transmission output signal is measured at the power monitor section 10175, to feed a measurement result back to the power amplifying section 101732.

The digital-signal processing section 1019 has a digital-transmission processing section 10191, a digital-reception processing section 10192 and a transmission-signal test processing section 10193. Meanwhile, the transmission-signal test processing section 10193 is arranged by a power measuring section 101931, a spectrum analyzing section 101932 and a modulation-accuracy analyzing section 101933, to test for the performance of a transmission signal. This corresponds to the test section.

The analog-digital converting section 1016 has a D/A converting section 10161 and A/D converting sections 10162, 10163.

Explanation is made below on the operation for determining a success/failure of configuration by evaluating transmission signal performances, such as transmission power during transmission, leak power to the adjacent channel and modulation accuracy, in the software radio apparatus 100 configured as above.

The digital-transmission processing section 10191 generates a digital value of a test signal required to evaluate the performance of a transmission signal, and outputs it to the D/A converting section 10161. Herein, the test signal uses a signal using, for example, a pseudo random code as transmission data and processed by a predetermined modulation process.

Then, the test transmission signal converted into an analog signal in the D/A converting section 10161 is subjected to a predetermined frequency-conversion process and power amplification in the analog-transmission processing section 10173. The amplified test transmission signal is transmitted through the antenna switch 10172 and antenna 10171. Meanwhile, the signal outputted from the power amplifying section 101732 is, on one hand, supplied to the power monitor section 10175 and measured for power of test transmission signal. The measurement result is fed back to the power amplifying section 101732, on one hand, in order for power control, and supplied to the A/D converting section 10162 and supplied, after digital-converted, to the power measuring section 101931 of the transmission-signal test processing section 10193. The power measuring section 101931 measures a power value and determines whether or not an obtained power value is made as a predetermined transmission power.

Meanwhile, on one hand, the antenna switch 10172, because part of the transmission signal leaks into the reception system, conducts performance test on another signal by the use of the leak signal. The analog-reception processing section 10174 carries out a reception operation in tune with an RF frequency of the transmission signal in the timing the above test transmission is made, besides the operation in the timing to carry out the usual reception signal processing. A low-noise amplifying section 101741, although amplifying an input signal, may be arranged to suppress amplification gain where there is great leak amount of a test transmission signal. The amplified test signal is subjected to a predetermined frequency conversion process and filtering process in the frequency converting section 101742. The obtained test signal in low frequency band is converted into a digital signal in the A/D converting section 10163. The obtained digital signal is supplied to the digital-reception processing section 10192, and to a spectrum analyzing section 101932 and modulation-accuracy analyzing section 101933 of the transmission-signal analyzing section 10193.

The spectrum analyzing section 101932 carries out an FFT (fast Fourier transform) process or DFT (discrete Fourier transform) process on the input digital signal, and computes a spectrum characteristic at around the frequency band of the test signal. The obtained spectrum characteristic is used to determine whether or not the transmission spectrum also has properties, such as mask characteristic and leak power ratio to the adjacent channel band, satisfying a predetermined regulation.

Meanwhile, the modulation-accuracy analyzing section 101933 computes a modulation accuracy of the test signal from the input digital signal, and determines whether or not a computation value satisfies a predetermined regulation value.

In the above, in the case that a desired characteristic is not satisfied in any of the power measuring section 101931, the spectrum analyzing section 101932 and the modulation-accuracy analyzing section 101933, it is determined that the post-configuration operation in the software radio apparatus 100 is not normal.

Incidentally, when testing such a transmission signal, radio waves may be prevented from radiating by removing the connection to the antenna 10171. In this case, the connection-removal operation may be done as a physical disconnecting operation by the user or as an automatic removing operation based on electric switching on/off.

Incidentally, the above explained the operation example of test on the premise of TDD. However, also in the case of FDD, similar test is possible to conduct by providing an antenna coupler in place of the antenna switch 10172. Namely, in case the characteristic the transmission signal leaks toward the reception system in the antenna coupler is previously stored, it is possible to conduct a test by the use of a transmission signal tuned to the same RF frequency as the transmission signal in the reception signal and leaked to the reception signal as in the above.

The software radio apparatus arranged as above downloads, from the download server 102, the software including a program and data setting to generate by itself a transmission signal in the software radio section 101 and reception-operate the outputted signal by the software radio section 101 itself. By the output operation from the software radio section 101 newly configured, the analog-reception processing section 10174 receives the signal transmitted by itself and evaluate the signal whether a desired performance is satisfied.

As a third concrete example, in the case that an abnormal amount of current flows in the power supply section of the software radio section 101 or battery consumption in the case of battery drive is more intense than expected, it is possible to detect an abnormal operation in the software radio section 101 and determine a success/failure of configuration in an equivalent fashion by observing these symptoms.

In the case determined that the arrangement has not completed normally in the above determination, configuration failure information 111 is notified to the download server 102 (step S111), and thereafter the procedure is ended. In the case determined that the arrangement has completed normally, the process moves to step S106.

Incidentally, in this determination, operation may be made such that resetting is tried a predetermined number of times even in the case resetting has not been successful.

Then, the download control section 103 of the software radio apparatus 100 sends, to the download server 102, a key-information request signal 112 notifying a normal completion of configuration in the software radio section 101 and requesting for sending an execution-allowing key information (step S106). Herein, the signal 112 includes both individual ID information provided to the software radio apparatus 100 and ID information of the user who uses the software radio apparatus 100. Incidentally, concerning the part of individual ID or user ID information, the arrangement may be with encryption in respect of security. Individual ID information can use a number to be assigned to the individual radio apparatus, e.g., manufacture serial number, radio-station license number or the like of the software radio apparatus 100. The user ID, in the case of credit card ID number or membership-based service, can use member's number or the like.

Then, the download server 102, when receiving an execution allowing key request signal 112 sent from the software radio apparatus 100, individually authenticates the software radio apparatus 100 on the basis of the ID information contained in the signal, and processes for billing or the like as required (step S107). In the case of a failure of individual authentication or billing process for a certain reason, failure-concerned information 113 is notified to the software radio apparatus 100 (step S112). Thereafter, the procedure is ended. In the case the individual authentication or billing process is completed normally, the process moves to step S108.

Then, the execution-allowing key information 114 is forwarded from the download server 102 to the download control section 103 of the software radio apparatus 100 through the communication link 105 (step S108). Herein, the execution-allowing key information 114 assumably corresponds to a differential program or differential-setting data for canceling the limitation matter in the respective component sections of the CPU 1013, DSP 1014, FPGA 1015, analog-digital converting section 1016 and analog processing section 1017 of the software radio section 101. Meanwhile, the execution-allowing key information 111 may be structured with encryption to be decrypted only by the software radio apparatus 100, in respect of security.

Then, the configuration control section 1012 of the software radio apparatus 100 writes part of the newly downloaded differential program or differential-setting data to the respective component sections, thereby completing the configuration to the software radio section 101. All the functions based on the new configuration are made usable (step S109).

As in the above, according to the embodiment of the invention, when the software radio apparatus 100 is reconfigured in function by downloading software, after the configuration for the software radio section 101 is completed normally, provided again are an execution-allowing differential program and setting data for the software radio apparatus 100. Because all the functions of software are made executable only by resetting using this differential program, it is possible to prevent the operation, such as abnormal radio transmission, in the case that the configuration based on the downloaded software is not normally completed, causing an imperfect status of radio apparatus. Meanwhile, by sending execution-allowing data after authentication by the software radio apparatus or user's individual ID, it is possible to manage the configuration information of an individual software radio apparatus or to prevent the disguise by other software radio apparatus.

Incidentally, the arrangement detail of the software radio apparatus is not limited to the arrangement of FIG. 1. For example, the digital-signal processing section 1019 not necessarily requires all of the CPU 1013, the DSP 1014 and the FPGA 1015. The combination is to be taken free in accordance with design. For example, there is a case of an arrangement with only FPGA 1015 or an arrangement with only DSP 1014. Meanwhile, besides these devices, the arrangement may be by a device capable of being reconfigured. Meanwhile, a processing section based on ASIC or the like may be included, as required, as one of the component sections in order for processing in a particular application. This has no effect upon the invention.

Meanwhile, the software radio apparatus 101 in this embodiment was arranged to collectively store the setting data, such as for the CPU, the DSP and the FPGA, in the non-volatile memory 1011. However, the invention is not limited to this. For example, the arrangement may be such that non-volatile memory sections for storing setting data are provided for the respective component sections so that the download control section 103 can be controlled to store the downloaded program or setting data to the respective non-volatile memory sections.

Meanwhile, in the explanation of this embodiment, explanation was made that part of operation or control is limited for the respective ones of the program or setting data in the component sections obtained by the download in procedure (step S102). The invention is not limited to this. For example, rewrite may be merely made such that, instead of limiting operation or control to all the component sections, part of the component sections undergoes operational limitation. For example, the arrangement may be rewritten only in the program for the CPU 1013, to make a jumping over to an performance test routine in place of the main process routine. Otherwise, the arrangement may be provided to limit the operation in such a way not to allow jumping over to a particular interrupt process routine. Meanwhile, as one example of operation limitation in the analog processing section 1017, the arrangement was made such that the receivable channel upon radio signal reception is limited only to one particular part of channels or the gain amount in amplifying reception signal is limited. However, the invention is not limited to this. For example, the arrangement may be provided not to allow transmission operation itself. Otherwise, by broadening and changing the pass-band width in a filter of the reception system, control may be made to limit the reception sensitivity performance by positively degrading the reception SNR characteristic.

Meanwhile, it was mentioned that there is no especial limitation for the communication link 105 to be used in software download. Furthermore, the channel for the data 106 to be downloaded in procedure (step S102) and the channel for downloading execution-allowing key information 114 in procedure (step S108) do not necessarily require to be the same. For example, by using a broadcast-type communication link for downloading the data 106 while using a communication-type link for downloading the execution-allowing key information 114, the arrangement may be provided to achieve both of communication traffic efficiency improvement and privacy assurance. Otherwise, the arrangement may use a wired link for downloading data 106, and a wireless channel generated by the software radio section 101 configured by the software data 106 downloaded in procedure (step S102) for downloading execution-allowing key information 114. In this case, limitation may be made to software data 106 in a manner enabling only a wireless-communication operation for downloading execution-allowing key information 114.

Figure 2:
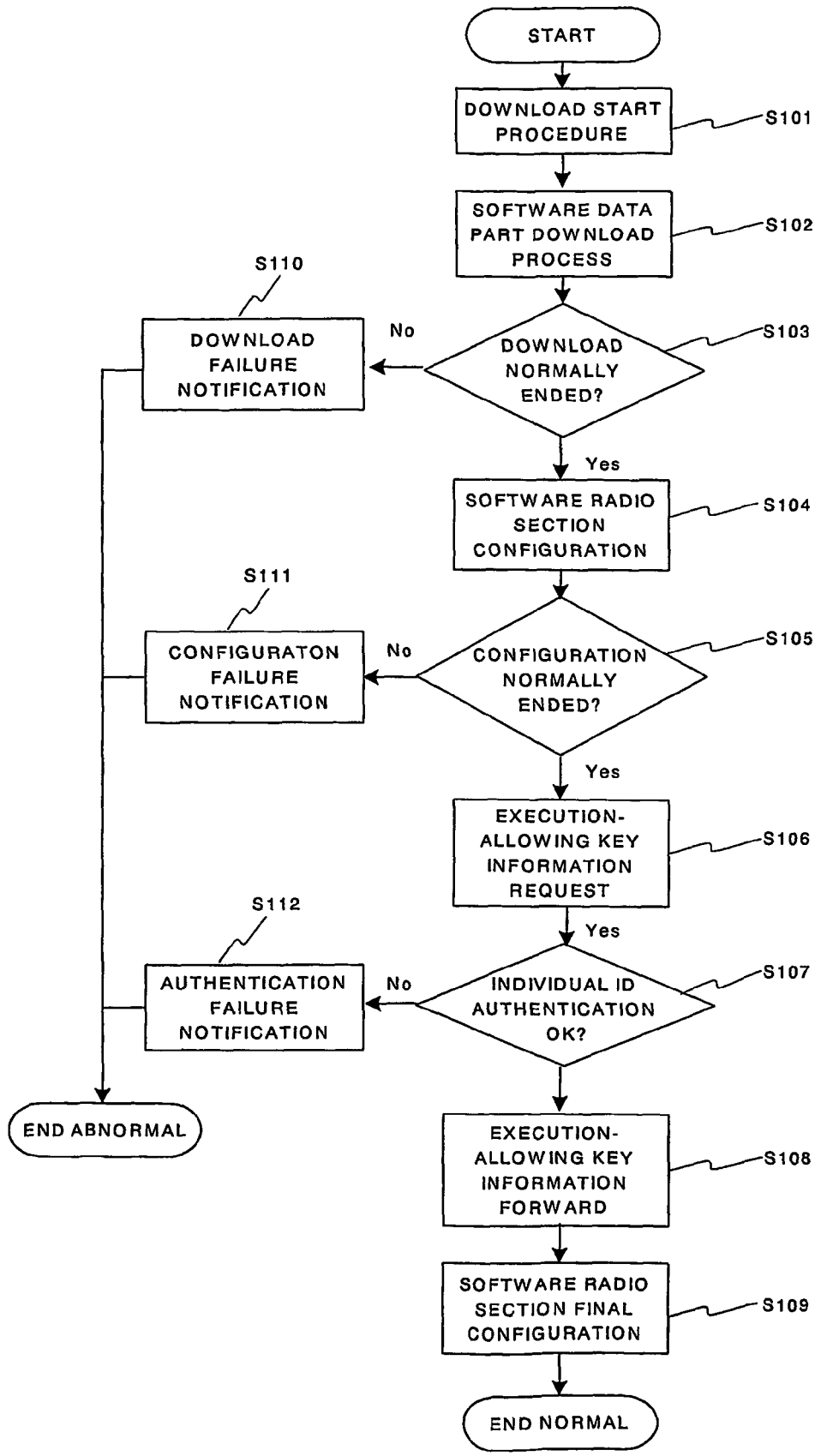
FIG. 2 is a flowchart showing an operation procedure of software download and configuration in the first embodiment of the invention.

Meanwhile, in the invention, concerning the ending procedure upon a failure of download, configuration, individual authentication or the like, there is no limitation to the procedure shown in FIG. 2. Another procedure may be taken to the followed.

Incidentally, in this embodiment, the software downloaded in procedure (step S102) was partly limited in operation or the like. However, this is not limited to. For example, as described in the second concrete example for determining a success/failure of configuration completion on each component section, the to-be-download program assumably contains a self-check program of whether or not the software radio section 101 configured operates normally in function and performance. By executing this program, determination may be made whether or not the arrangement in procedure (step S105) has normally ended. Meanwhile, the execution-allowing key information forwarded in procedure (step S108) may contain such information as to delete or skip a self-check program part. In the final configuration in procedure (step S109), the arrangement or method may be provided to change the setting for deletion or skipping.

Embodiment 2

This embodiment explains the arrangement and procedure for obtaining execution permission for all the functions by reading a program part out of the storage memory to thereby carry out configuration upon updating the software radio apparatus by software download, followed by taking a process of obtaining an execution permission from the license server.

Figure 3:
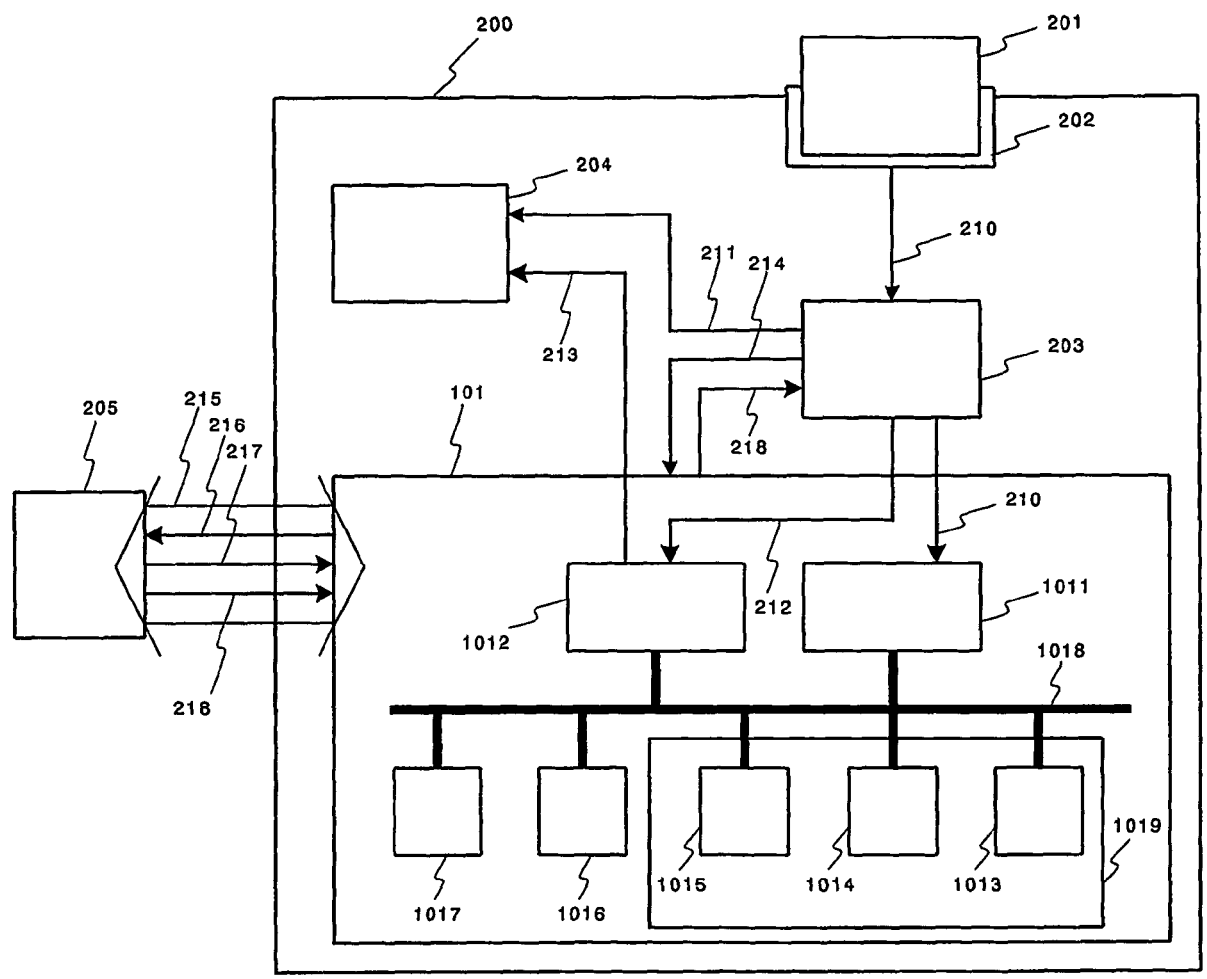
FIG. 3 is a download system arrangement diagram for a software radio apparatus in a second embodiment of the invention.

FIG. 3 shows a download system arrangement for a software radio apparatus in embodiment 2.

In FIG. 3, a software radio apparatus 200 is different from the arrangement of FIG. 1 shown in embodiment 1 in that a download control section 203 is provided in place of the download control section 103 and a user interface section 204 and interface section 202 are newly provided. The software radio apparatus 200 is allowed to read out the program data stored in a software-data storage media 201 by a connection to the software-data storage media 201. Also, the difference from the download system for a software radio apparatus shown in FIG. 1 lies in that a license server 205 is provided in place of the download server 102.

The software-data storage media 201 is stored with the program data for configuring the software radio section 101, to output this program data by a connection to an interface section 202. This is configured by a non-volatile memory, e.g., a flash ROM.

The interface section 202 connects between the software-data storage media 201 and the download control section 203, reads out and outputs the program data stored in the software-data storage media 201, under control of the download control section 203.

The download control section 203 reads out, with the software-data storage media 201, a program, setting data, etc. for configuration to the software radio section 101 through the interface section 202, transfers it to the non-volatile memory section 1011, and inputs and outputs control information 211, 214, 218 with the software radio section 101. Meanwhile, this outputs the information related to download control to the user-interface section 204. Herein, the detail of control information and download control will be described later.

The user interface 204 is to convey information to the user who is to use the software radio apparatus 200. This is, for example, structured by a display section, e.g., a display or an LED, a sound output section such as a speaker, and the like. In this embodiment, it is assumably structured by a display as one example, to assumably display on the display the control information about software download control as characters.

The license server 205 constitutes a wireless communication link with the software radio apparatus 200, to provide execution-allowing key information for the software radio section over the wireless communication link. The detail of the operation will be described later.

In the download system for a software radio apparatus arranged as above, the operation for configuring software data to the software radio apparatus 200 is explained below, step by step, in a part different from the procedure shown in FIG. 2, while using an arrangement of FIG. 3 and a flowchart shown in FIG. 4.

In the case to change the function of the software radio section 101, check is made whether or not the interface section 202 of the software radio apparatus 200 has connected the software-data storage media 201. This is repeated until a connection is detected (step S201).

Then, the download control section 203 reads out the configuring program and setting data 210 for software radio section 101 stored in the software-data storage media 201 through the interface section 202, and transfers it to the non-volatile memory section 1011 (step S202). Incidentally, also in this embodiment, the setting data for component section in the software radio section 101 is partly rewritten intentionally similarly to the first embodiment. Namely, the functions to be executed in nature in the software radio section 101 are limited in part thereof.

Then, the download control section 203 of the software radio apparatus 200 determines whether or not the program and data part of software have been normally transferred to the non-volatile memory section 1011. In the case not normally transferred, transfer-failure notification information 211 notifying the fact that the transfer is failed is outputted to the user-interface section 204 (step S211). Thereafter, the procedure is ended. In the case that the transfer has normally completed, transfer-completion notification information 212 is supplied to the configuration control section 1012, and the process moves to step S204.

Then, the setting data 210, transferred under control of the configuration control section 1012 of the software radio apparatus 200 and stored in the non-volatile memory section 1011, is read out and supplied to each component section through the bus 1018, to effect configuration for the software radio section 101 (step S204). Specifically, executed for example are PLL setting parameter change of the synthesizer in the analog processing section 1017, setting value change of quantization bits and sampling rate in the analog-digital converting section 1016, gate array rearrangement in the FPGA 1015, and execution program loading in the DSP 1014 and CPU 1013.

Then, the configuration control section 1012 determines whether or not the configuration in each component section by the step S204 has been completed (step S205), and supplies a determination result 110 to the download control section 203. Herein, for how to determine a success/failure of configuration completion, it is possible to apply the arrangement and operation similar to the concrete examples shown in the first embodiment. In the case the configuration has not been normally completed, configuration-failure information 213 is notified to the user-interface section 204 (step S212) and thereafter the procedure is ended. In the case the configuration has been normally completed, the process moves to step S206.

Incidentally, in this determination, even in the case that resetting is not successful, operation may be made for trial-resetting a plurality number of times.

Then, the download control section 203 of the software radio apparatus 200 starts up the software on the software radio section 101 by a start-up signal.

Then, software radio section 101 of the software radio apparatus 200 build a radio communication link 215 with the license server 205 and sends, to the license server 205, a key-information request signal 216 notifying a configuration normal completion in the software radio section 101 and requesting for sending execution-allowing key information (step S207). Herein, as for the radio specification and protocol for session commencement upon arranging a radio communication link 215 at between the software radio section 101 and the license server 205, no especial limitation is made in the invention. It may be previously determined with the software configured to the license server 205 and software radio section 101. Herein, the key-information request signal 216 contains the individual ID information given to the software radio apparatus 200 or the ID information of a user using the software radio apparatus 200, similarly to the signal 112 in embodiment 1. Incidentally, as for the individual ID or part of the user ID information, the arrangement may be with encryption in respect of security. The user ID can use a credit card ID number or a member's number in the case of a membership-based service.

Then, the license server 205, when receiving the execution-allowing key-information request signal 216 sent from the software radio apparatus 200, individually authenticates the software radio apparatus 200 on the basis of the individual ID information contained in the signal, and processes for billing or the like as required (step S208). In the case the individual authentication or billing process is failed for a certain reason, failure-concerned information 217 is notified to the software radio apparatus 200 (step S213), and thereafter the process is ended. In the case the individual authentication or billing process is normally completed, the process moves to step S209.

Then, the execution-allowing key information 218 is forwarded from the license server 205 to the download control section 203 through the wireless communication link 215 and software radio section 101 (step S209). Herein, the execution-allowing key information 218 assumably corresponds to a differential program or differential-setting data for canceling the limitation matter in the respective component sections of the CPU 1013, DSP 1014, FPGA 1015, analog-digital converting section 1016 and analog processing section 1017 of the software radio section 101. Meanwhile, the execution-allowing key information 218 may be structured with encryption to be decrypted only by the software radio apparatus 200, in respect of security.

Then, the configuration control section 1012 of the software radio apparatus 200 writes part of the newly downloaded differential program or differential-setting data to the respective component sections, thereby completing the configuration over the software radio section 101. All the functions based on the new configuration are made usable (step S210).

As in the above, according to the embodiment of the invention, when the software radio apparatus 100 is reconfigured in function by reading out the software stored in the storage media, after the configuration to the software radio apparatus 100 is completed normally, provided again is an execution-allowing differential setting data for the software radio apparatus 100. Because all the functions of software are made executable only by resetting using it, it is possible to prevent the operation, such as abnormal radio transmission, in the case that the configuration of the new software is not normally completed, causing an incomplete status of the radio apparatus. Meanwhile, by sending execution-allowing data based on the individual ID of the radio apparatus, it is possible to manage the configuration information of an individual software radio apparatus or to prevent the disguise by other software radio apparatuses.

Incidentally, in this embodiment, although explanation was made to structure the software-data storage media 201 by a flash ROM, the invention is not limited to this. It is satisfactory that program data can be stored and program data can be read out by a connection to the software radio apparatus 200 through an interface. Accordingly, the arrangement may be for example by a memory device, such as a ROM or an EEPROM, other than a flash ROM, a light-storage media such as a CD-R, a magnetic media such as a floppy disk.

Meanwhile, in this embodiment, although the arrangement was that communication of an execution-allowing key-information request 216 and execution-allowing key-information request 218 and exchange of other pieces of control information are made through the radio communication link 215 for communication in the software radio section 101, the invention is not limited to this arrangement and operation. For example, the arrangement may be by using a wireless link not relying upon a wired link or the software radio section 101 in place of the radio communication link 215, as in the communication link 105 in the FIG. 1 arrangement.

Embodiment 3

This embodiment explains the arrangement and procedure in obtaining from a media storing execution-allowing key information, instead of the method of obtaining execution-allowing key information through the wireless communication link, when configuring the software radio section by reading out a program part out of the storage memory, as explained in embodiment 2.

Figure 5:
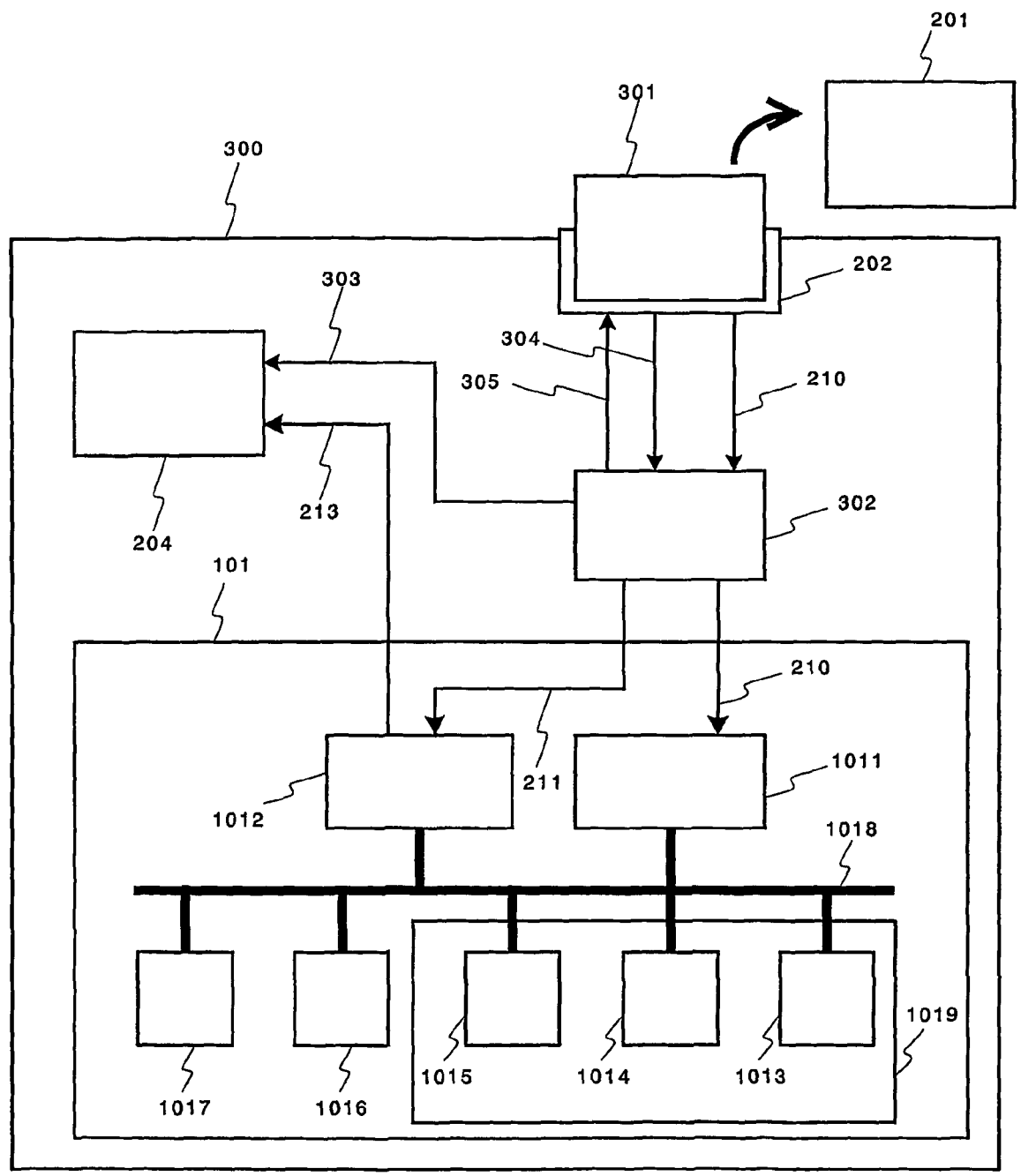
FIG. 5 is an arrangement diagram of a software radio apparatus in a third embodiment of the invention.

FIG. 5 shows an arrangement of a software radio apparatus in embodiment 3. A software radio apparatus 300 is different from the arrangement of FIG. 3 shown in embodiment 2 in that an execution-allowing key information storage media 301 is made connectable through an interface section 202 instead of a connection to the license server 205 through the radio communication link 215, and a download control section 302 is provided in place of the download control section 203. The other arrangement and operation is the same as that of the same reference number in the software radio apparatus 200 of FIG. 3.

The execution-allowing key information storage media 301 is a media storing the information corresponding to the execution-allowing key information already explained in embodiments 1 and 2. By a connection with the interface section 202, the information is read out. Also, the information is written (overwritten, including erasure) into the storage media through the interface section 202. Meanwhile, in this embodiment, the execution-allowing key information storage media 301 assumably is stored with also the information for authenticating the individual ID of the software radio apparatus 300. Incidentally, this execution-allowing key information storage media 301 is structured by a non-volatile memory, e.g., a flash ROM.

The download control section 302 reads out the data stored in the storage media through the interface section 202 and transfers it to the non-volatile memory section 1011. Also, it performs writing on the basis of the write-command information to the storage media, and input/output control information 210, 211, 303 to/from the software radio section 101 and the user-interface section 204.

Figure 6:
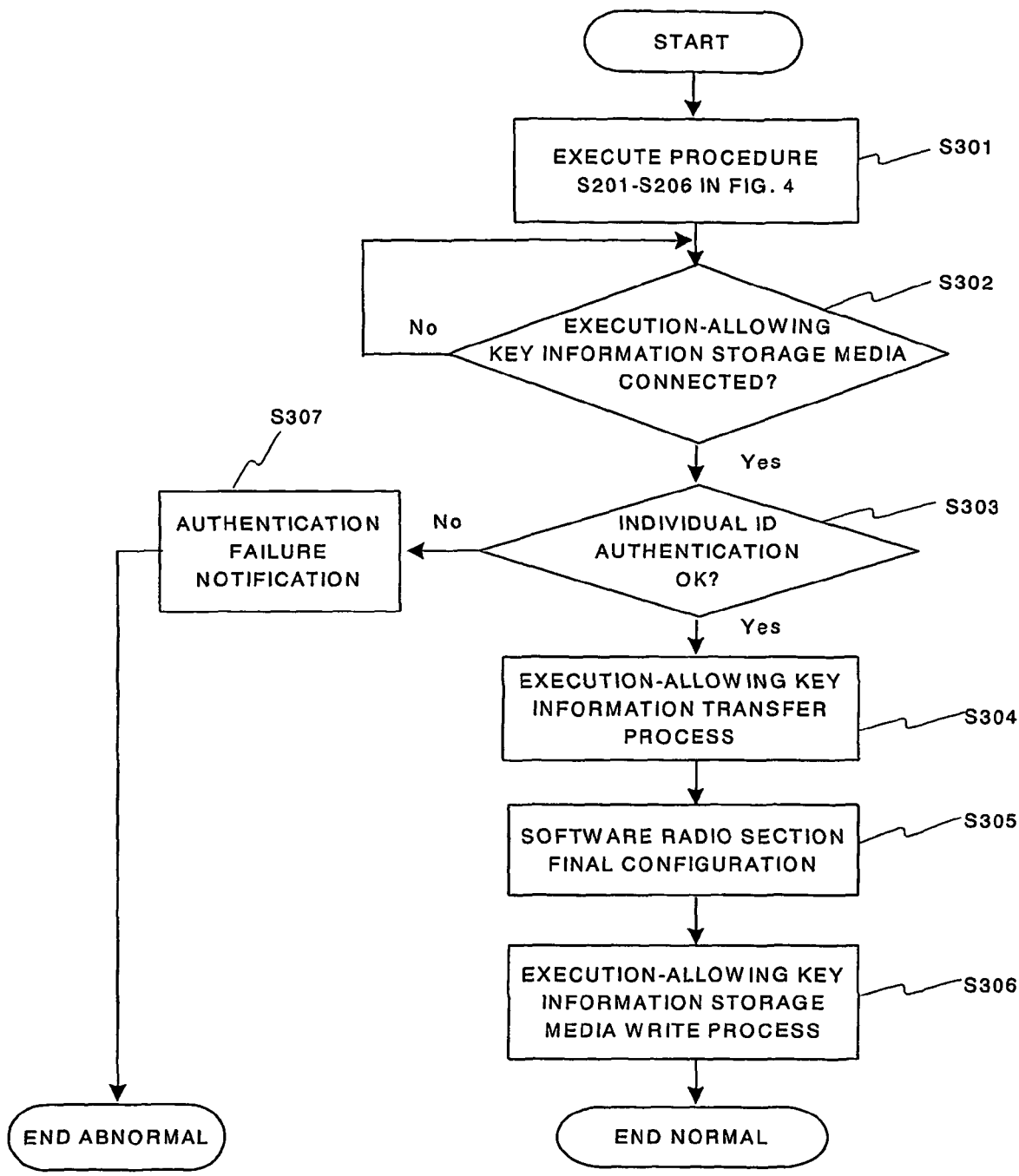
FIG. 6 is a flowchart showing an operation procedure of software download and configuration in the third embodiment of the invention.

In the software radio apparatus 300 arranged as above, the operation for downloading and configuring software data, is explained below step by step in a part different from the procedure shown in FIG. 2, while using an arrangement of FIG. 5 and a flowchart shown in FIG. 6.

Figure 4:
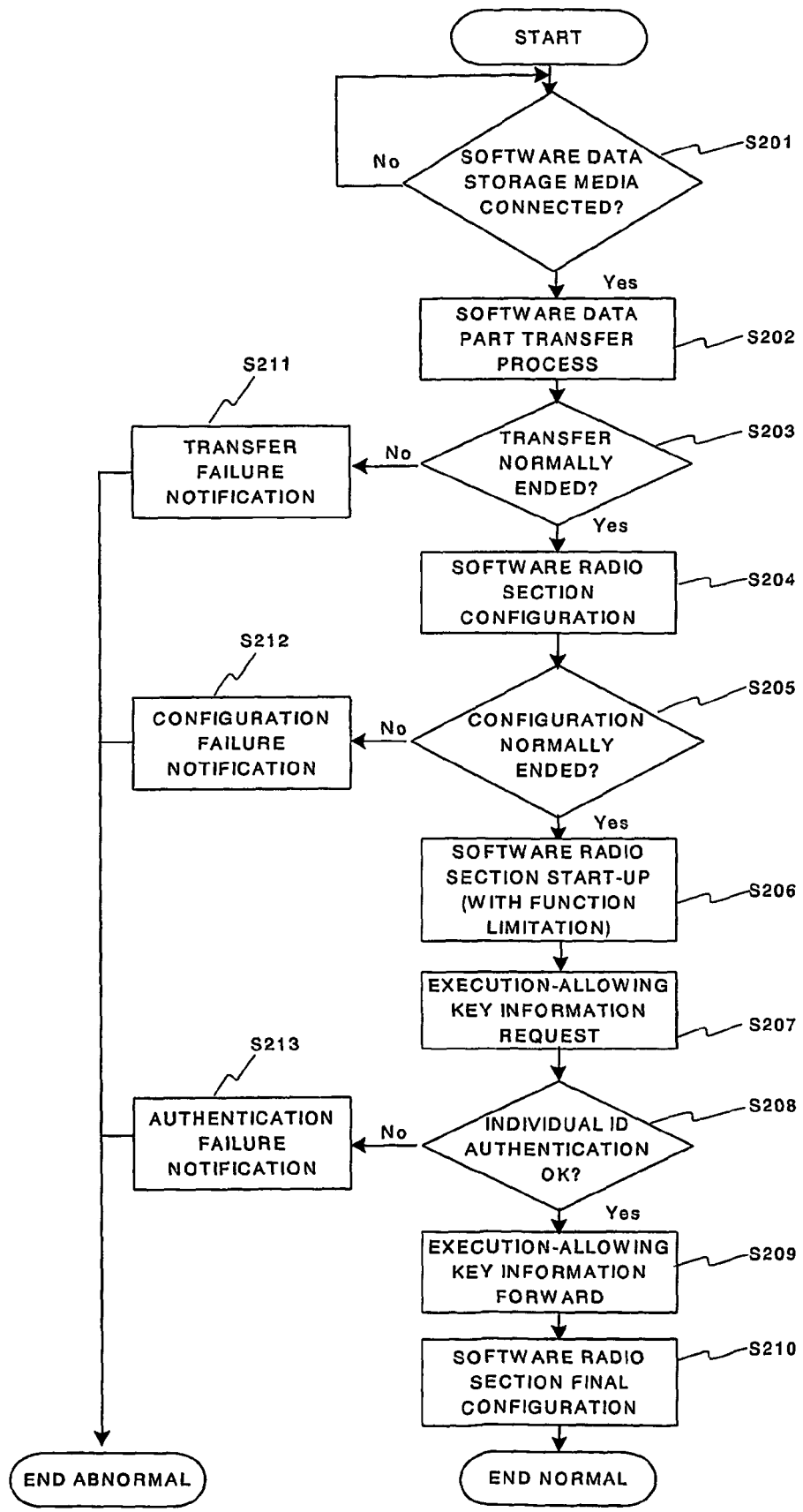
FIG. 4 is a flowchart showing an operation procedure of software download and configuration in the second embodiment of the invention.

In the case to change the function of the software radio section 101, by the process from procedure (step S201) to procedure (step S206) in FIG. 4 shown in embodiment 2, the software data stored in the software storage media 201 is read out to configure the software radio section 101.

Then, check is made whether or not the execution-allowing key information storage media 301 is connected to the interface section 202, which is repeated until a connection is detected (step S302). Then, individual ID authentication is made between the download control section 302 of the software radio apparatus 300 and the execution-allowing key information storage media 301, to authenticate whether or not the software radio apparatus 300 or a user using it is to be allowed for execution by the execution-allowing key information storage media 301 (step S303). In the invention, there is no especial limitation in the method for individual authentication. Various methods already disclosed are applicable. In the case the authentication process is failed for a certain reason, the information 303 about failure is notified to the software radio apparatus 300 (step S307), and thereafter the process is ended. In the case the authentication process is normally completed, the process moves to step S304.

Then, the execution-allowing key information 304 is transferred from the execution-allowing key information storage media 301 to the download control section 303 through the interface section 202. Herein, the execution-allowing key information 304, as in the embodiment 2, assumably corresponds to a differential program or differential-setting data for canceling the limitation matter in the respective component sections of the CPU 1013, DSP 1014, FPGA 1015, analog-digital converting section 1016 and analog processing section 1017 of the software radio section 101. Meanwhile, the execution-allowing key information 304 may be configured with encryption to be decrypted only by the software radio apparatus 300, in respect of security.

Then, the configuration control section 1012 of the software radio apparatus 300 writes part of the newly downloaded differential program or differential-setting data to the respective component sections, thereby completing the configuration on the software radio section 101. All the functions based on the new configuration are made usable.

Then, in the stage the final configuration completed, a write signal 305 for writing the information that configuration has been normally completed and the software radio apparatus 300 is using a software execution license is outputted to the execution-allowing key information storage media 301 through the interface section 202 (step S306).

As in the above, according to the embodiment of the invention, when the software radio apparatus 300 is reconfigured in function by reading out the software stored in the storage media, after the configuration to the software radio section is completed normally, again provided is an execution-allowing differential setting data for the software radio apparatus by the storage media. Because all the functions of software are made executable only by resetting using that, it is possible to prevent the operation, such as abnormal radio transmission, in the case that the configuration of the new software is not normally completed, causing an incomplete status of radio apparatus. Meanwhile, by sending execution-allowing data based on the individual ID of the radio apparatus, it is possible to manage the configuration information of an individual software radio apparatus or to prevent the disguise by other software radio apparatuses. Furthermore, in the stage the final configuration is completed on the software radio apparatus, information representative of license-under-use is written to the media storing the execution-allowing key information. This can makes it impossible to connect the storage media to another software radio apparatus and use the license.

Incidentally, the individual ID is not limited to an individual ID on the software radio apparatus 300 but may be an individual ID of the user who is to use the software radio apparatus 300, specifically an ID number, a password or the like of the credit card possessed by the user.

Meanwhile, this embodiment was arranged that the execution-allowing key information storage media stores also the information for individual ID authentication, to limit the software radio apparatus capable of executing the software. The invention is not limited to this. Individual authentication is not always required. By providing an arrangement without authentication based on individual IDs and making requisite the procedure to write the information representative of license-under-use to the executing-allowing key information storage media 301 in the state the final configuration is completed on the software radio apparatus 300 as in the procedure (step S306), it is possible to prevent against providing execution permission to many and unspecified software radio apparatuses. Conversely, in the case of an arrangement essentially requiring individual authentication by the procedure (step S303), the write process to storage media in the procedure (step S306) is not necessarily required.

INDUSTRIAL APPLICABILITY

As above, the present invention is useful for a radio communication apparatus having a function to be changed by changing software, and suited for updating the function by software download.

DRAWING REFERENCE NUMBER LISTING 100, 200, 300, 700 SOFTWARE RADIO APPARATUS
101, 701 SOFTWARE RADIO SECTION 102, 702 DOWNLOAD SERVER
103, 203, 302, 703 DOWNLOAD CONTROL SECTION
105, 705 TRANSMISSION LINE
201 SOFTWARE DATA STORAGE MEDIA
202 INTERFACE SECTION
204 USER INTERFACE SECTION
205 LICENSE SERVER
301 EXECUTION-ALLOWING KEY INFORMATION STORAGE MEDIA
1011, 7011 NON-VOLATILE MEMORY SECTION
1012, 7012 CONFIGURATION CONTROL SECTION
1016 ANALOG-DIGITAL CONVERTING SECTION
1017 ANALOG PROCESSING SECTION
1018, 7013 BUS
1019 DIGITAL-SIGNAL PROCESSING SECTION
10161 D/A CONVERTING SECTION
10162, 10163 A/D CONVERTING SECTION
10171 ANTENNA
10172 ANTENNA SW
10173 ANALOG-TRANSMISSION PROCESSING SECTION
101731 FREQUENCY CONVERTING SECTION
101732 POWER AMPLIFYING SECTION
10174 ANALOG-RECEPTION PROCESSING SECTION
101741 LOW-NOISE AMPLIFYING SECTION
101742 FREQUENCY CONVERTING SECTION
10175 POWER MONITOR SECTION
10191 DIGITAL-TRANSMISSION PROCESSING SECTION
10192 DIGITAL-RECEPTION PROCESSING SECTION
10193 TRANSMISSION-SIGNAL TEST PROCESSING SECTION
101931 POWER MEASURING SECTION
101932 SPECTRUM ANALYZING SECTION
101933 MODULATION-ACCURACY ANALYZING SECTION

The invention claimed is:

1. A method for updating software in a radio communication system comprising a radio communication apparatus having a communication function to be changed by changing software and a download server for supplying software to the radio communication apparatus, the method comprising the steps of:

downloading from the download server to the radio communication apparatus software data in which a part of the communication function is limited by a limitation;
storing the downloaded software data in a memory device by the radio communication apparatus;
reconfiguring by the radio communication apparatus the communication function by use of the software data stored in the memory;
testing a performance of the communication function by the radio communication apparatus to determine whether or not reconfiguration of the communication function has been successfully completed;
requesting by the radio communication apparatus an execution-allowing key information for canceling the limitation of the communication function in a case when it is determined that the reconfiguration of the communication function has been successfully completed;
supplying from the download server to the radio communication apparatus the execution-allowing key information in response to the request; and
canceling by the radio communication apparatus the limitation of the communication function by use of the execution-allowing key information supplied by the server.

2. The method according to claim 1, further comprising the steps of:
performing the test by outputting a transmission signal generated by the radio communication apparatus as a power that can be detected by the radio communication apparatus itself, and
determining whether or not the transmission signal received satisfies a predetermined performance, and providing a normal test result in a case of satisfying the predetermined performance.

3. The method according to claim 2, further comprising the steps of:
determining whether or not the predetermined performance is satisfied by determining that a spectrum mask of the transmission signal, power leakage outside of an occupation band, modulation accuracy of a modulation signal including phase jitter and amplitude variation, and reception power, are within a range of a predetermined value.

4. The method according to claim 1, further comprising the steps of:
downloading the software data on a first channel, and
transmitting the execution-allowing key information on a second channel.

5. The method according to claim 4, further comprising the steps of:
downloading the software data on the first channel which is a channel for a broadcast type communication or a multicast type communication, and
transmitting the execution-allowing key information on the second channel which is a channel for an individual communication type.

6. The method according to claim 1, further comprising the steps of:
limiting the communication function by at least one of limiting a digital signal process and limiting an analog reception process in the radio communication apparatus,
restoring by the execution-allowing key information which is differential program data the program of the digital signal process in a case the digital signal process is limited, and canceling by a control data an operation limitation in the analog reception process in a case the analog reception process is limited.

7. A method for updating software in a radio communication system comprising a radio communication apparatus having a communication function to be changed by changing software and a license server for supplying an execution-allowing key information for canceling a limitation in the communication function, the method comprising the steps of:

downloading from a media to a connected radio communication apparatus software data in which a part of the communication function is limited;

storing the downloaded software data in a memory device by the radio communication apparatus;

reconfiguring by the radio communication apparatus the communication function by use of the downloaded software data stored in the memory device;

testing a performance of the communication function by the radio communication apparatus to determine whether or not reconfiguration of the communication function has been successfully completed;

requesting to the license server from the radio communication apparatus the execution-allowing key information for canceling the limitation of the communication function in a case when it is determined that the reconfiguration of the communication function has been successfully completed;

supplying from the license sever to the radio communication apparatus the execution-allowing key information in response to the request; and canceling by the radio communication apparatus the limitation of the communication function by use of the execution-allowing key information supplied by the server.

8. The method according to claim 7, further comprising the steps of:

performing the test by outputting a transmission signal generated by the radio communication apparatus as a power that can be detected by the radio communication apparatus itself, and determining whether or not the transmission signal received satisfies a predetermined performance, and providing a normal test result in a case of satisfying the predetermined performance.

9. A method of updating software comprising the steps of:

downloading from a first media to a connected radio communication apparatus software data in which a part of a communication function of the radio communication apparatus is limited by a limitation;

storing the downloaded software data in a memory device by the radio communication apparatus;

reconfiguring by the radio communication apparatus the communication function by use of the downloaded software data stored in the memory device;

testing a performance of the communication function by the radio communication apparatus to determine whether or not reconfiguration of the communication function has been successfully completed;

downloading from a second media to the connected radio communication apparatus an execution-allowing key information for canceling the limitation of the communication function when it is determined that the reconfiguration of the communication function has been successfully completed; and canceling by the radio communication apparatus the limitation of the communication function by use of the execution-allowing key information.

10. The method according to claim 9, further comprising the steps of:

writing to the second media from the radio communication apparatus information representative of being already-used after canceling the limitation of the communication function by use of the execution-allowing key information.

11. The method according to claim 9, further comprising the steps of:

performing the test by outputting a transmission signal generated by the radio communication apparatus as a power that can be detected by the radio communication apparatus itself, and determining whether or not the transmission signal received satisfies a predetermined performance, and providing a normal test result in a case of satisfying the predetermined performance.

12. A radio communication apparatus having a communication function to be changed by changing software, the radio communication apparatus characterized by comprising:

a download control section for downloading software in which a part of the communication function is limited by a limitation and downloading an execution-allowing key information for canceling the limitation of the communication function;

a memory device for storing the downloaded software;

a software radio section for reconfiguring the communication function by use of the downloaded software stored in the memory device; and a test section for testing a performance of the communication function to determine whether or not the reconfiguration of the communication function has been successfully completed;

whereby, when the test section determines that the reconfiguration of the communication function has been successfully completed, the download control section downloads the execution-allowing key information to the software radio section and cancels the limitation of the communication function.

13. The radio communication apparatus according to claim 12, wherein the memory device of the software radio section is non-volatile memory for storing the software downloaded by the download control section, the software radio section has a configuration control section for updating the communication function by use of the software stored.

14. The radio communication apparatus according to claim 13, wherein the limitation of the communication function of the downloaded software is a part of a program for a digital signal processing section in the software radio section, and the execution-allowing key information is differential program data for restoring the program for the digital signal processing section.

15. The radio communication apparatus according to claim 12, wherein the limitation of the communication function of the downloaded software is a part of a program for a digital signal processing section in the software radio section, and the execution-allowing key information is differential program data for restoring the program for the digital signal processing section.

16. A radio communication apparatus having a communication function to be changed by changing software, the radio communication apparatus characterized by comprising:

an interface section for having a connection with a media storing software;

a first download control section for downloading software from the media through the interface section in which a part of the communication function is limited by a limitation;

a memory device for storing the downloaded software;

a software radio section for reconfiguring the communication function by use of the downloaded software stored in the memory device;

a second download control section for having a connection to a license server for supplying through a wireless communication channel connected with the software radio section an execution-allowing key information to cancel the limitation of the communication function; and a test section for testing a performance of the communication function to determine whether or not reconfiguration of the communication function by the software downloaded by the first download control section has been successfully completed;

whereby, when the test section determines that the reconfiguration of the communication function has been successfully completed, the second download control section downloads the execution-allowing key information to the software radio section and cancels the limitation of the communication function.

17. The radio communication apparatus according to claim 16, wherein the software includes a program for connecting through a wireless communication channel with the license server by updating the downloaded software in the software radio section.

18. A radio communication apparatus having a communication function to be changed by changing software, the radio communication apparatus characterized by comprising:

an interface section for having a connection with a media for storing at least one of software data and an execution-allowing key information for canceling a limitation of the communication function;

a download control section for downloading, from the media, the software in which a part of the communication function is limited and downloading through the interface section, the execution-allowing key information;

a memory device for storing the downloaded software;

a software radio section for reconfiguring the communication function by use of the downloaded software stored in the memory device; and a test section for testing a performance of the communication function to determine whether or not the reconfiguration of the communication function by the software has been successfully completed;

whereby, when the test section determines that the reconfiguration of the communication function has been successfully completed, the download control section downloads the execution-allowing key information to the software radio section and cancels the limitation of the communication function.

* * * * *